Aug. 11, 1959 M. R. FENSKE ET AL 2,899,375
HEAT TRANSFER TO BEDS OF GRANULAR SOLIDS
Filed Dec. 31, 1953 4 Sheets-Sheet 1

INVENTORS
MERRELL R. FENSKE
RICHARD H. CRISWELL
BY
Peter H. Smolka
ATTORNEY

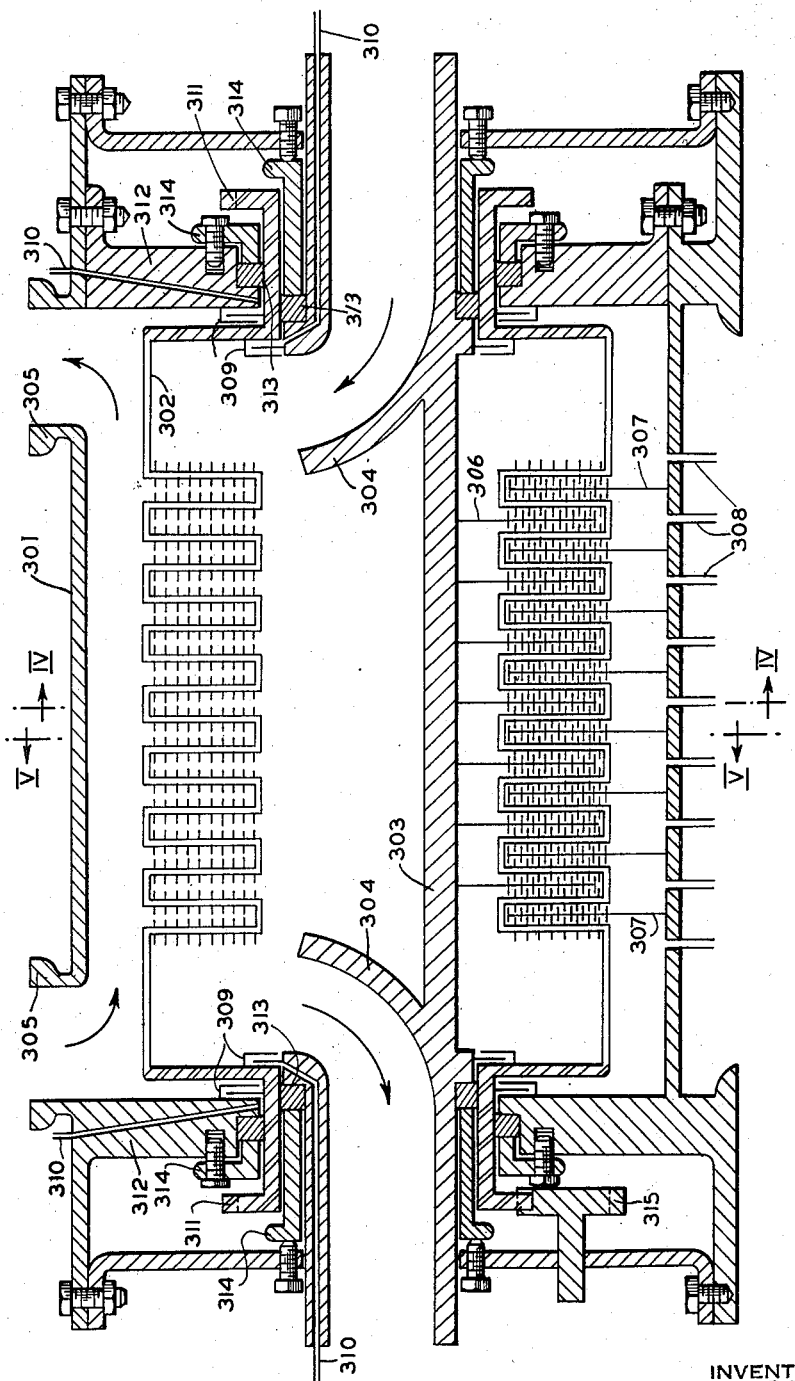

Aug. 11, 1959   M. R. FENSKE ET AL   2,899,375
HEAT TRANSFER TO BEDS OF GRANULAR SOLIDS
Filed Dec. 31, 1953   4 Sheets-Sheet 3

INVENTORS
MERRELL R. FENSKE
RICHARD H. CRISWELL
BY Peter H. Smolka
ATTORNEY

Aug. 11, 1959    M. R. FENSKE ET AL    2,899,375
HEAT TRANSFER TO BEDS OF GRANULAR SOLIDS
Filed Dec. 31, 1953    4 Sheets-Sheet 4

INVENTORS
MERRELL R. FENSKE
RICHARD H. CRISWELL
BY Peter H. Smolka
ATTORNEY

United States Patent Office 2,899,375
Patented Aug. 11, 1959

2,899,375

HEAT TRANSFER TO BEDS OF GRANULAR SOLIDS

Merrell R. Fenske, State College, and Richard H. Criswell, Port Matilda, Pa., assignors to Esso Research and Engineering Company, a corporation of Delaware Application December 31, 1953, Serial No. 401,495

11 Claims. (Cl. 208—48)

This invention relates to an improvement in transferring heat to and from gaseous phases. More particularly the invention relates to a novel heat transfer apparatus and method involving contact between a wall and a moving bed of well-mixed but essentially unaerated granular solids. Still more specifically the invention relates to the use of the novel system for gas-to-gas heat transfer in the operation of gas turbines, in operations involving high temperature vaporization of liquids, coking of carbonaceous materials, calcining and so on.

The efficiency of gas phase heat exchangers of the conventional plate-and-fin type is usually limited by relatively low gas film coefficients such as 10 to 15 B.t.u./(hr.) (sq. ft.) (° F.). Such exchangers also tend to fail in service due to fouling of the heat transfer surfaces or the excessive temperatures involved. Furthermore, they frequently introduce an undesirable pressure drop. Likewise, in many instances it has been necessary to avoid direct firing of the main heat transfer surface and to interpose instead an expensive working fluid such as fused salts, mercury, or biphenyl, involving the use of auxiliary boilers and other equipment.

Some of the foregoing disadvantages have been heretofore at least partially avoided by carrying out the heat transfer in a bed of fluidized solids, that is, in a bed comprising a dense turbulent mixture of finely divided solid particles suspended in an upflowing gas. In such fluid systems it has been shown that the heat transfer coefficient on a surface immersed in the fluid bed increases with increasing gas velocity from a very low value at the incipient fluidization point to a maximum value. Past this maximum value, however, the gas-solid mixture exists in an increasingly dilute state and the coefficient drops rapidly from the maximum. Moreover, in such studies it has also been noted that the heat transfer to immersed surfaces is limited by a seemingly unavoidable agglomeration of the solid particles into larger masses near the heat transfer surface, so that the heat transfer is less effective than expected for particles of a given size. Furthermore, when the phenomenon of channeling or slug-flow appears in a conventional fluid bed, as it frequently does, the heat transfer coefficient between the solids and the wall is reduced because gas envelopes, rather than particulate solids, are in contact with the wall. Finally, because of the inherent turbulence of a fluid bed it is difficult to provide for countercurrent exchange of heat using the conventional fluid bed technique. As a result of these factors, even fluid systems leave much to be desired with regard to heat transfer and generally are limited to heat transfer coefficients of well under 200 B.t.u./(hr.) (sq. ft.) (° F.).

It is the object of the present invention to provide an improved system for transferring heat to or from a gas phase, or between two gas phases. A second object is to provide a compact heat exchanger characterized by a high heat transfer coefficient. A third object is to provide heat transfer systems which can operate at low as well as very high temperatures and avoid difficulties due to fouling. A fourth object is to facilitate heat transfer with a minimum pressure drop. A fifth object is to provide a means for countercurrent heat flow at high heat transfer levels, i.e., with good coefficients. These and other objects, as well as the manner in which they can be attained, will become more clearly apparent from the subsequent description and accompanying drawing wherein Fig. 1 is a longitudinal sectional elevation of a paddle-type heat exchanger embodying the present invention;

Fig. 3 is a longitudinal sectional elevation of a somewhat different type of heat exchanger particularly adapted for gas-to-gas heat transfer;

Figure 2:
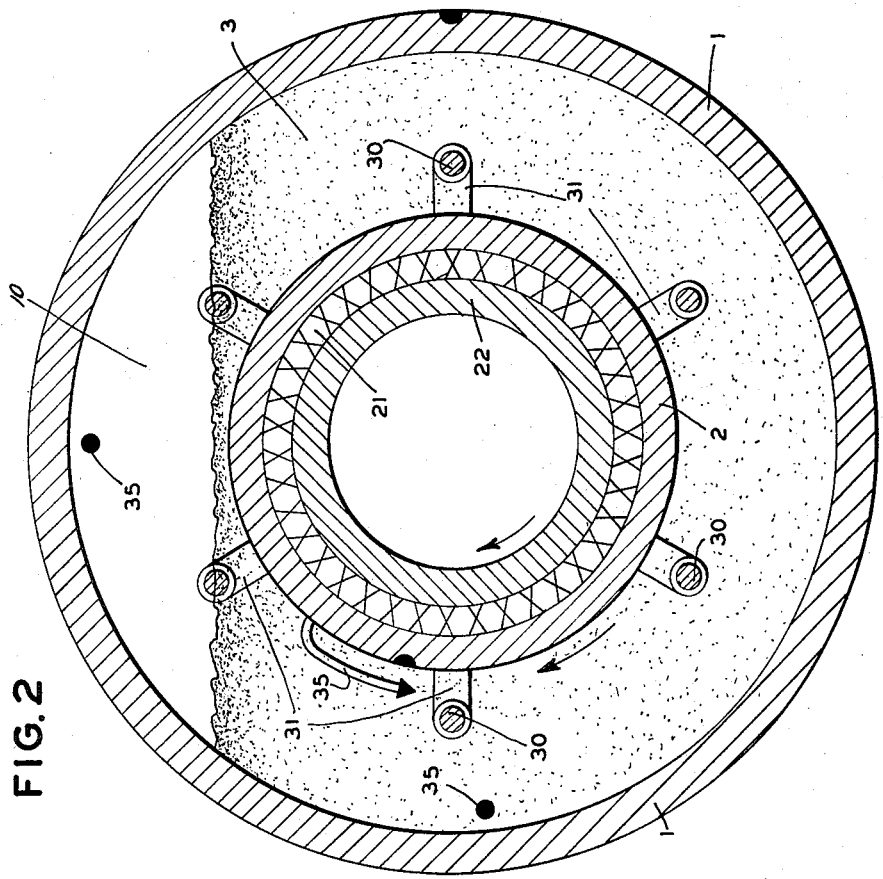
Fig. 2 is a transverse sectional elevation taken through Fig. 1 along lines II—II.

It has now been discovered that surprisingly effective heat transfer can be achieved between a gas phase and a solid heat transfer surface, if the transfer is effected through the medium of a bed of granular solids which are maintained for the most part in an unaerated but well-mixed condition. In fact, heat transfer coefficients have now been obtained which, especially with the coarser size solids, coincide with theoretical coefficients calculated for the actual particle size, indicating substantial absence of agglomeration. Furthermore, with material having a relatively large particle size, heat transfer coefficients well in excess of 100 and even 200 B.t.u./(hr.) (ft. $^2$) (° F.) have been obtained. To illustrate the invention further, a typical operation will be described with reference to the apparatus shown in Figures 1 and 2 of the drawing.

Figure 1:
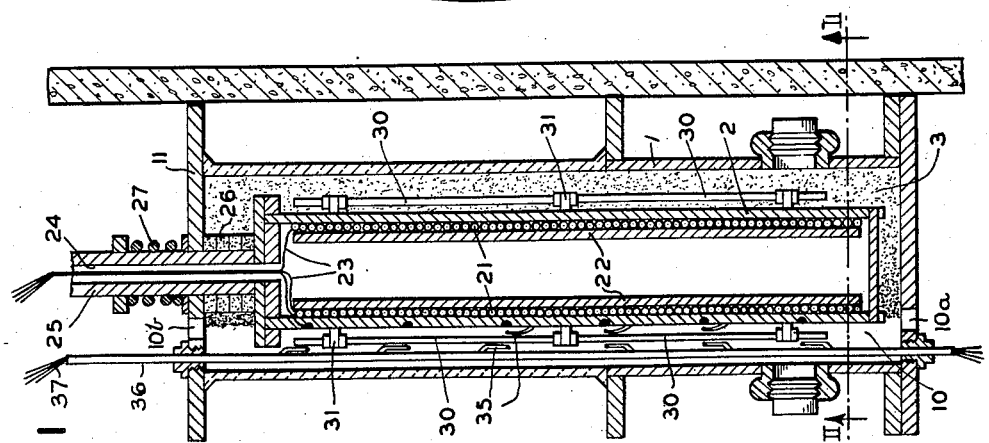

Referring to Figures 1 and 2, the apparatus comprises two concentric cylinders, about 20 inches long. The inner rotatable cylinder 2, such as a 3.5 inch O.D. steel pipe, is mounted in a stationary horizontal cylindrical shell 1, such as a 6 inch I.D. Pyrex pipe. If desired, the outer shell may be insulated in the usual manner. Drilled shaft 25 connects rotor 2 with a motor (not shown) which is adapted to drive the rotor at a rate of about 100 to 300 r.p.m. A bed of granular solids 3 is placed in the annulus between the two cylinders to a depth which will more or less completely submerge the inner cylinder while leaving a gas space 10 in the upper part of the annulus. Inlet and outlet passageways 10a and 10b communicate with the gas space through the end walls of the outer shell 1. This granular bed 3 provides the main thermal contact with the inner cylinder or rotor wall 2.

Heat may be supplied to the rotor wall by electrical means as shown. For instance, resistance wire 21 may be wound on an inner core such as steel pipe 22 and fitted closely against the inside wall of rotor 2 to form a heating coil of about 3000 watt capacity. Heavy leads 23 from windings 21 may be brought through a bore hole 24 in the rotor shaft 25 and finally through a milled slot (not shown) to conventional copper collecting rings against which are held carbon brushes of the type used in automotive starters. The rotor shaft 25 may be advantageously sealed in the end flange 11 of outer shell 1 with the aid of graphite discs 26. The end flange may be spring loaded against the graphite seals by a heavy steel spring 27. Of course, instead of electric heating, heat may be supplied to the rotor by passing therethrough a suitable heat transfer fluid such as steam, liquid biphenyl, mercury, etc. In such a case another drilled shaft (not shown) with suitable connections will be provided at the rotor end opposite from shaft 25 to permit circulation of the heating medium, which may be gaseous or liquid. Also, where the heating fluid comprises a burning mixture of air and coal, for instance, the outlet shaft may be turned up or baffled inside the rotor so as to reduce entrainment of unburned fuel from the unit. Furthermore, instead of using the device for heating, it may be used for cooling, e.g., by circulating cooling water through the rotor.

An effective device for providing the desired heat transfer from rotor wall 2 to the incoming gas stream in space 10 involves placing solid paddles at regular intervals around the periphery of the rotor. The paddles are designed so as to throw continually a cloud of solid particles from the bed into the incoming gas stream which is to be heated, or cooled, as the case may be. For instance, six steel paddles in the shape of 1/16 inch wide steel strips 30 may be mounted on rotor 2 with the aid of supports 31. However, paddles of other shapes such as a multiplicity of relatively flat or curved small perforated fins aligned essentially in parallel with the axis of rotation and distributed around the outer surface of rotor 2 may be used similarly to stir the bed and throw up the solid particles into the gas stream. Thermocouples in thermocouple wells 35 can be located at various points on the rotor surface as well as in the granular bed and gas space, as desired. In Figure 1, certain of the thermocouple wells 35 are shown as mounted on a conduit 36, the conduit being adapted to carry couple leads such as designated by the numeral 37.

An alternative, though less universally effective means for obtaining heat transfer from the bed to the gas may consist of disc-like screens or perforated plates being mounted transversely along the rotor perpendicular to its axis at close intervals, e.g. 0.5 to 2 inches. Little or no solid particles are thrown into the gas space 10 from bed 3 in this device. Instead, the discs extract heat from the hot solid bed when they become immersed therein and they transfer this heat to the gas as they emerge from the bed while revolving with the rotor 2.

To illustrate the efficacy of the invention, tests were made in the device shown in Figures 1 and 2, using a variety of granular solids as summarized in Table I below. In these runs air at atmospheric pressure was heated from room temperature to temperatures of 350° to 450° F., with rotor temperatures not in excess of 500° F. The coefficients of heat transfer, referred to as "$h$," from the bed to the rotor wall were calculated on a basis of total cylinder wall area, since the rotor was substantially completely submerged in the granular bed in these runs. The tabulated "actual" heat transfer coefficients are the coefficients observed for the given material. Rotor surface velocity was necessarily limited to the range of values listed, due to the requirements of good bed mixing and adequate solids throw-up.

TABLE I

*Heat transfer data*

| Particle Material | Particle Size (Microns) | Gas Velocity (Ft./Sec.) [4] | Rotor Velocity (Ft./Sec.) | Steel Paddle Width (Inches) [3] | Experimental Coefficient, [5] B.t.u./(Hr.) (Ft.²) (° F.) | Derived Coefficient, [2] B.t.u./(Hr.) (Ft.²) (° F.) |
|---|---|---|---|---|---|---|
| Steel Shot Cylinders [1] | 800 | 4.8 | 2.3 | 3/8 | 39 | 38 |
|  |  | 9.4 | 2.3 | 3/8 | 34 | 38 |
|  |  | 4.7 | 2.7 | 3/8 | 44 | 65 |
| Iron Shot Spheres | 520 | 8.5 | 2.7 | 3/8 | 40 | 65 |
|  |  | 0 | 2.2 | 1/16 | 65 | 50 |
| Alumina Granules | 125 | 0 | 2.4 | 1/16 | 110 to 120 | 120 |
|  |  | 2.6 | 2.0 | 3/8 | Approx. 250 | 250 |
| Nickel Powder | 40 | 3.8 | 2.0 | 3/8 | Approx. 250 | 250 |
|  |  | 0 | 2.3 to 2.7 | 1/16 | 150 to 200 | 250 |
| Copper Powder | 15 | 0 | 2.9 | 1/16 | 106 | 470 |
| 55% Copper and 45% Iron Spheres (By Volume) | 15 and 520, Resp. | 0 | 2.4 | 1/16 | 200 | 450 |

[1] These are cylinders manufactured from steel wire. The length is equal to the cylindrical diameter.
[2] Calculated for air at the average temperature and pressure of the gas "film" on the rotor surface.
[3] The paddles are steel strips, 1/16-inch thick, equally spaced about the cylinder and extending the length of the cylinder, namely 18 inches.
[4] This gas velocity, for the most part, is that flowing over and above the dense bed. Zero air velocity indicates an unsteady state heat transfer run made with the unit closed and the temperature of the bed and transfer surface changing with time.
[5] Cylinder-to-solid coefficient expressed as B.t.u./(hr.) (° F temperature difference between cylinder and particles) (sq. ft. of cylinder area).

The tabulated "derived" heat transfer coefficients were obtained from the following equation, which was experimentally obtained and is used here to present the relationships among the fluid and particle properties that are pertinent to the application of the invention:

$$h = 1.3 \left[ \frac{d^{0.4} c^{0.33} k^{0.67}}{u^{0.06}} \right] \left[ \left(\frac{V}{e}\right)^{0.4} \left(\frac{1}{D}\right)^{0.6} \right] = 1.3 (X)(Y)$$

where:

$$X = \left[ \frac{d^{0.4} c^{0.33} k^{0.67}}{u^{0.06}} \right] = \text{fluid properties}$$

$$Y = \left[ \left(\frac{V}{e}\right)^{0.4} \left(\frac{1}{D}\right)^{0.6} \right] = \text{particle properties}$$

$d$ = fluid (gas) density, lbs./ft.³
$c$ = fluid heat capacity, B.t.u./lb. ° F.
$k$ = fluid thermal conductivity, B.t.u./hr. ft.² ° F./ft.
$u$ = fluid viscosity, lb./hr. ft.
$V$ = relative velocity between the transfer surface and the fluid in the mixed bed, ft./hr.
$D$ = actual particle diameter, ft.
$e$ = fractional free space of the bed.
$h$ = heat transfer coefficient, B.t.u./(hr.) (sq. ft.) (° F.)

This equation applies to all kinds of gases. It will be noted that the equation contains a term, X, concerned with gas properties, as well as Y term containing properties relating to the particles such as the relative velocity, free space, and the particle diameter. At equal velocity, free space, and particle diameter, the heat transfer coefficient will, therefore, be a function of the term X only. Thus, for instance, the X term at 200° F. and 750 mm. Hg for helium and air is 0.0393 and 0.165, respectively. Consequently, the heat transfer coefficient under comparable conditions will be about 2.4 times greater for helium than for air. This has been experimentally verified in the apparatus of the invention.

It is apparent that the larger size materials such as the steel shot cylinders, the iron spheres, and the alumina granules correlate well with the coefficients derived for this type of bed-to-wall heat transfer. The rather fine nickel powder under conditions of severe mixing in the bed shows a tendency to assume a fluid character. The coefficient at higher rotor velocities is therefore, somewhat less than the value calculated from the above equation.

The copper powder, due to the very small particle size, can be maintained in a fluidized state by an extremely small fluid velocity in the bed, approximately 0.01 ft./sec. The components of fluid velocity set up in the unaerated bed of copper powder by the stirring and mixing action of the rotor paddles were sufficient to form a semi-fluid bed which was observed to be in an expanded condition relative to an unmixed bed. Because of this fluidization, the actual heat transfer coefficients were much lower than calculated.

A surprising improvement in heat transfer was obtained by mixing the copper powder with a substantial amount of the relatively coarse iron spheres. Since the large spheres are difficult to fluidize, their admixture with the copper powder minimizes both the expansion of the copper powder into a semi-fluid state and its agglomeration. It is for this reason that with the composite mixture the remarkably high heat transfer coefficient of 200 B.t.u./hr. ft.$^2$ ° F. more nearly approaches the corresponding theoretical derived value than in the case of the fine copper powder alone. It is also noted that in absolute terms this coefficient of the composite mixture is approximately double that obtained for the copper powder alone.

The resistance to heat flow from the granular solids to the air stream was very small. The approximate drop in temperature experienced by the solid particles as they travel through the air stream will usually be less than 1° F., e.g. 0.1 to 0.5° F., and the temperature difference between air and particle may be of the same order of magnitude. On the other hand, the temperature difference between the rotor wall and the air varied from between about 5° to 10° F. when using nickel powder, up to about 70° to 125° F. when employing the steel shot cylinders under otherwise similar conditions. The temperature drop from the rotor wall to the bed of solids thus essentially equals the temperature drop from the rotor wall to the air. The determined overall coefficient from rotor wall to air may, therefore, be taken as the heat transfer coefficient from the rotor wall to the bed.

Figure 5:
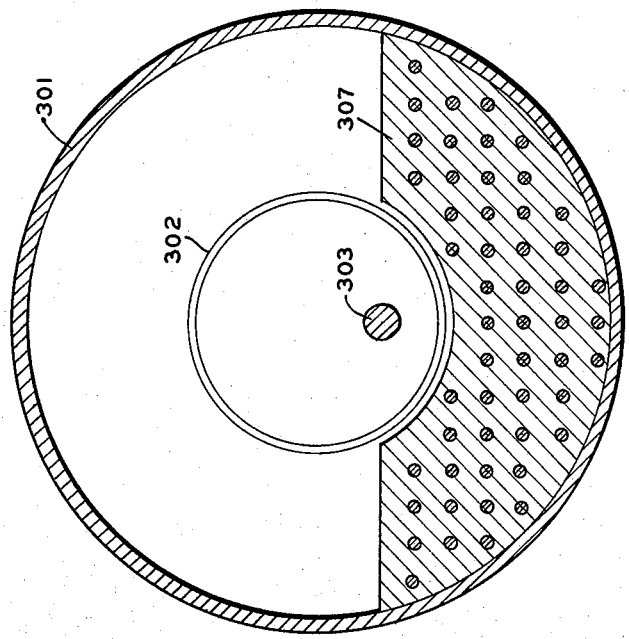
Figs. 4 and 5 are cross-sectional views taken through the heat exchanger of Fig. 3 along lines IV—IV and V—V, respectively.
Figure 4:
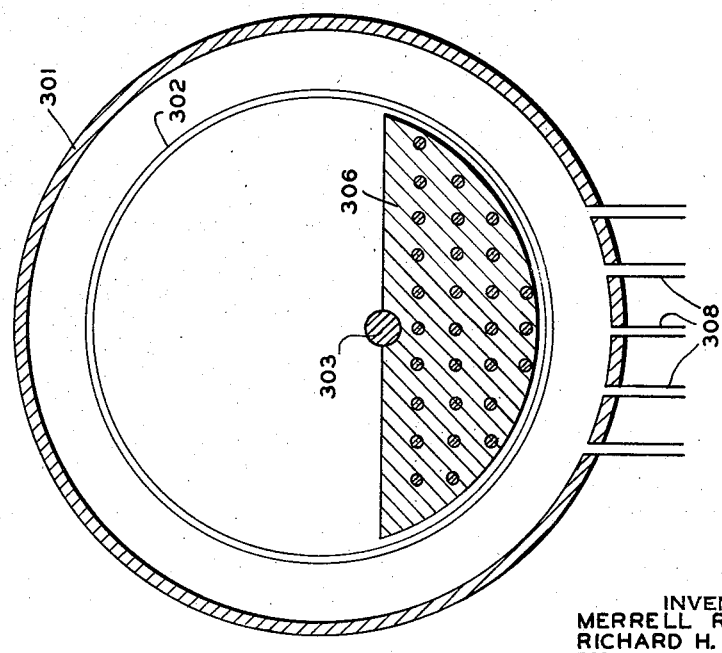

The device shown in Figures 3, 4, and 5 is a countercurrent gas-to-gas heat exchanger which utilizes beds of granular solid and extended heat transfer surface in the form of convolutions and fins to facilitate the transfer of heat between two gas streams.

The exchanger consists simply of a stationary outer shell 301 and rotating inner shell 302. The rotating inner shell 302 contains granular solid in the form of an agitated dense bed, preferably in an essentially settled or nonfluidized condition. The bed level of the solids may be approximately even with the stationary inner baffle support bar 303. The space above the inner bed is occupied by a flowing gas stream which enters and leaves the inner shell through ports 304.

The annular space between the rotating inner shell 302 and the outer stationary shell 301 is also filled with a dense bed of granular solids which may be agitated either in a settled or in a fluidized condition. The height of this bed may also be on a level with the inner baffle support bar 303. The remainder of the annular space is occupied by the other gas stream which enters and leaves the unit through ports 305.

The inner and outer beds of granular solid are in thermal contact through the inner rotating shell 302. The surface of this shell is convoluted and finned in order to provide increased heat transfer surface for heat exchange between the two beds of granular solid.

The inner and outer baffles 306 and 307, respectively, act to hinder both lateral and transverse motion of the inner and outer beds of granular solid. This action enables a countercurrent temperature gradient to be established in both beds of solid and enhances the bed-to-wall heat transfer by providing a high relative velocity between the rotating inner shell 302 and the beds of granular solid.

The rotary motion of the inner shell together with the lifting action of the fins on the shell wall maintain a cloud of solid particles in each gas stream by transporting these particles from the beds of granular solid located below the two gas spaces. Heat is transferred to or from the solid particles by their travel through each gas stream and, with the return of the particles to the beds below, heat is also exchanged between the agitated beds of granular solid through the rotating inner shell wall 302. Fluidizing gas for the outer bed may be introduced through inlet lines 308 in the outer shell 301.

Purge baffles 309 are provided between the inner shell shaft 311 and the outer shell end flange 312 and between the inner shell shaft and the stationary inner shell gas ports 304. These baffles are supplied with purge gas by purge lines 310 in order to keep the solid particles away from the packing 313 and packing glands 314 which provide a gas-tight seal between the two gas spaces in the exchanger and the surroundings.

A gear wheel 315 is driven by an external power supply and in turn rotates the inner shell 302.

This exchanger, in addition to being used as a gas-to-gas heat exchanger, can also be used primarily as a solids-to-solids exchanger. In such an application two streams of granular solids would be exchanging heat countercurrently and the gases associated with them would be unimportant.

Either of the beds of granular solid in the exchanger may be supplied with a solid, liquid, or gaseous fuel and with combustion air. The heat of combustion in this case would be removed by the other gas or solid stream traveling countercurrently.

The velocity of rotation of surface 302 is usually in the range of 2 to 10 feet per second.

Figure 6:
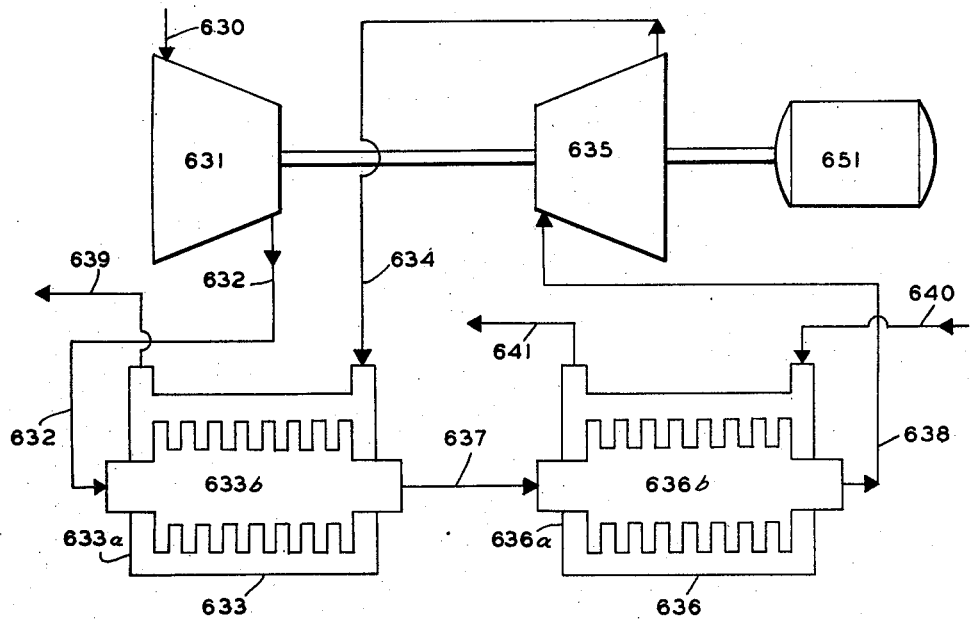
Fig. 6 is a flow diagram of a simple gas turbine cycle containing the novel heat exchange apparatus.

Figure 6 illustrates the use of the present type of heat exchanger as a heat regenerator or as a furnace or heater in a gas turbine cycle. This cycle may comprise a single turbine and compressor operating at a pressure ratio of 3 to 1 with the air or other working fluid entering the turbine at 1540° F. The incoming air fed through line 630 is compressed in the compressor 631. The compressed air is then passed through line 632 and preheated in the regenerator 633 by indirect heat exchange with hot exhaust gases fed through line 634 from turbine 635. The preheated air flows via line 637 and is further heated to a temperature of about 1540° F. in furnace or heater 636. It then flows through line 638 to gas turbine 635 where it is expanded, leaving via line 634. Gas exchangers 633 and 636 are similar in construction to that shown in Figure 3 and function in the same way. Chambers 633b and 636b revolve, respectively, in stationary shells 633a and 636a. The air or working fluid flows through chambers 633b and 636b in series, while the exhaust gas from turbine 635 only flows through chamber 633a. Exchangers 633 and 636 have granular steel spheres or similar particulate solids of about 0.3 to 1 mm. size in both the rotating and stationary chambers.

Exchanger 636 functions as a furnace in that it serves to heat the air or working fluid entering via 637 from about 1000° F. to 1540° F., which is its temperature in line 638. This heating is done by hot gases, or air plus fuel, entering through line 640 and leaving at 641. For example, a gaseous, liquid, or pulverized solid fuel plus air can be fed into line 640 so that combustion occurs in the presence of the granular, particulate solids in which rotor 636b is about half immersed. The heat is first given to these solids, which in turn impart it to the finned or fluted surface of chamber 636b. This heat passes through these surfaces to the granular, particulate solids contained inside chamber 636b. These solids, in turn, pass the heat to the air, or working fluid, flowing through chamber 636b. It should be noted that exchanger 636 operates in a countercurrent manner, as well as exchanger 633.

Hot combustion or flue gases, also can be used for the heating in exchanger 636. For example, coal can be burned on a grate in the conventional way, and these combustion gases can be sent through line 640 and exchanger 636 to exhaust via 641 to a stack. One of the main features of exchangers 633 and 636 is their low pressure drop to gases passing through them. This pressure drop would be essentially that of the same gas stream in an open tube since the free space is of the order of 99% and over. In the regenerator this saving in power appears as added net work output in the turbine cycle.

Using air as the working fluid, i.e. air entering line 630 at 15 lbs. per sq. in. absolute (p.s.i.a.) and compressing it to 45 p.s.i.a., a thermal efficiency of about 35% can be achieved in the equipment shown in Figure 6. That is, 35% of the heat energy liberated in, or flowed through exchanger 636, is converted into work, which can be used to drive, for example, an electrical generator, designated as 651. For this result the heated air enters turbine 635 at 1540° F., and the compressor and turbine efficiencies are 85 and 90%, respectively. Regenerator, or heat exchanger 633, has an efficiency of 75%. That is, 75% of the heat energy in the air in line 634 is transferred to the air in line 637 by means of this countercurrent gas-to-gas exchanger 633.

The importance of regenerator efficiency, or of the function performed by exchanger 633, is evident from the following Table II.

TABLE II

*Effect of regenerator efficiency on turbine cycle efficiency*

[Conditions=3 to 1 pressure ratio, using air as the working fluid, and the air inlet temperature to the turbine of 1540° F. Air entering line 630 is at 90° F. and 15 p.s.i.a.]

| Percent Regenerator Efficiency | Percent Cycle Thermal Efficiency |
|---|---|
| 0 | 18 |
| 20 | 20 |
| 40 | 24 |
| 60 | 28 |
| 80 | 37 |
| 90 | 40 |

The importance of low pressure drop in a regenerator such as 633, or a heater such as 636, is shown by the data in Table III. This is for an open air cycle, with the temperature of the gas or air to the turbine at 1540° F., using a 6 to 1 pressure ratio, a turbine efficiency of 90%, a compressor efficiency of 85%, and a regenerator efficiency of 75%.

TABLE III

*Effect of regenerator pressure drop on cycle efficiency*

| Regenerator Pressure Drop, Lbs. per Sq. In. | Percent Cycle Thermal Efficiency |
|---|---|
| 0 | 37 |
| 2.5 | 32.5 |
| 5 | 28 |
| 7.5 | 22.4 |
| 10 | 18 |
| (no regeneration) | 28 |

These data show that a pressure drop of 5 lbs. per sq. in. would, for the cycle conditions given, reduce the thermal efficiency of the cycle to the value obtainable without any regeneration. It is because of this requirement of low pressure drop that heretofore it has been necessary to use conventional regenerators or heat exchangers of very large volume compared to the volume of the novel heat exchangers employing gas flow across the surface of an agitated bed of granular solids.

A further advantage of the use of the novel rotary, granular bed heat exchanger, is in the ability to use closed cycles in gas turbines. For example, referring to Figure 6, if the gas or working fluid leaving via line 639 is cooled so it can reenter line 630, then a closed cycle gas turbine results. There are several advantages to this procedure. First the gas can be recycled at elevated pressure, thereby reducing the volume of items 631, 633, 635 and 636. For example, the gas leaving line 639 and entering at 630 could be at 150 p.s.i.a., or one-tenth its volume when feeding air at atmospheric pressure to compressor 631 via line 630. Second, the gas can be inert, such as nitrogen, argon, or helium, and there would then be no chemical attack on the hot turbine blades. Third, the gas can be selected so its heat transfer characteristics are better than air. Helium, for example, gives heat transfer coefficients over twice those for air. The gas-to-gas exchanger of the present invention makes possible the attainment of such advantages.

Referring again to Figure 6, and the open air cycle discussed using a 3 to 1 pressure ratio, a turbine air inlet temperature of 1540° F., and the 35% thermal efficiency, the following are approximae dimensions for exchangers 633 and 636, when the cycle is generating 2000 net horsepower, that is, load 651 receives 2000 H.P. Exchangers 633 and 636 are constructed similar to the unit in Figure 3. The convolutions are spaced from about 1 to 2 inches apart. Using a logarithmic mean temperature difference of 200° F. between the two countercurrently flowing gas streams, exchanger 636 would be about 12 feet long, with the diameter of the rotor or inner member 636b about 6 feet, and that of the stationary outer shell 636a about 8 feet. For the regenerator 633 having a 75% regenerator efficiency and the same 200° F. mean temperature difference between the two countercurrently flowing gas streams, its length would be about 12 feet, with the diameter of the inner revolving member 633b of about 5 feet, and that of the outer stationary chamber 633a of about 8 feet.

The granular, particulate particles may be of various sizes, shapes and materials. Usually the application will suggest the best materials. For example, when the temperatures are not high enough to melt the particles and where the gases are noncorrosive, the particles may be steel, either as spheres, or cylinders of length and diameter approximately equal. Such particles are commonly used for shot peening and blasting. For higher temperatures and more corrosive gases, quartz, fused alumina, sand, and other ceramic particles are suitable. As pointed out in the heat transfer equation given earlier, the principal particle property governing the heat transfer is the size of the particles, and the free space of the bed. This is surprising in that particle density, thermal conductivity, or specific heat are not dominant properties.

The particles should be selected to be strong structurally, to resist fracture and attrition.

Table IV below illustrates the role of particle size on the heat transfer coefficient for n-heptane gas at 270° C. and 1 atmosphere pressure to a surface such as a wall, tube, or sheet, also in contact with the particles. These coefficients are for heat transfer from the gas to one square foot of surface. The temperature difference (° F.) is that between the gas and the surface or wall. The coefficient, H, is expressed as B.t.u./(hr.) (sq. ft.) (° F.). The velocity, V, is the relative velocity between the particles and the surface.

TABLE IV

*Effect of particle size on heat transfer coefficent, H*

| Particle Size (Microns) | H=B.t.u./(hr.) (Sq. ft.) (° F.) ||
| --- | --- | --- |
| | V=5 ft./sec. | V=10 ft./sec. |
| 50 | 260 | 340 |
| 100 | 170 | 225 |
| 500 | 65 | 85 |
| 1,000 | 45 | 55 |
| 2,000 | 25 | 35 |

The novel heat exchanger may also be adapted for numerous other uses including vacuum vaporization, distillation of residual oils, coking, drying and calcining requiring high temperatures. For instance, the granular mixed bed may be maintained within the rotating inner cylinder and oil may be sprayed onto the exposed outer surface of the rotor by means of nozzles located in the space or annulus between the outer shell and the rotor. Scraper knives may be located at the rotor surface to remove the coke deposit in a manner otherwise well known. Cooling surfaces may be positioned near the rotor surface to enable the liberated vapors to condense. Also the rotor could be arranged in a vertical position instead of being horizontal.

Figure 7:
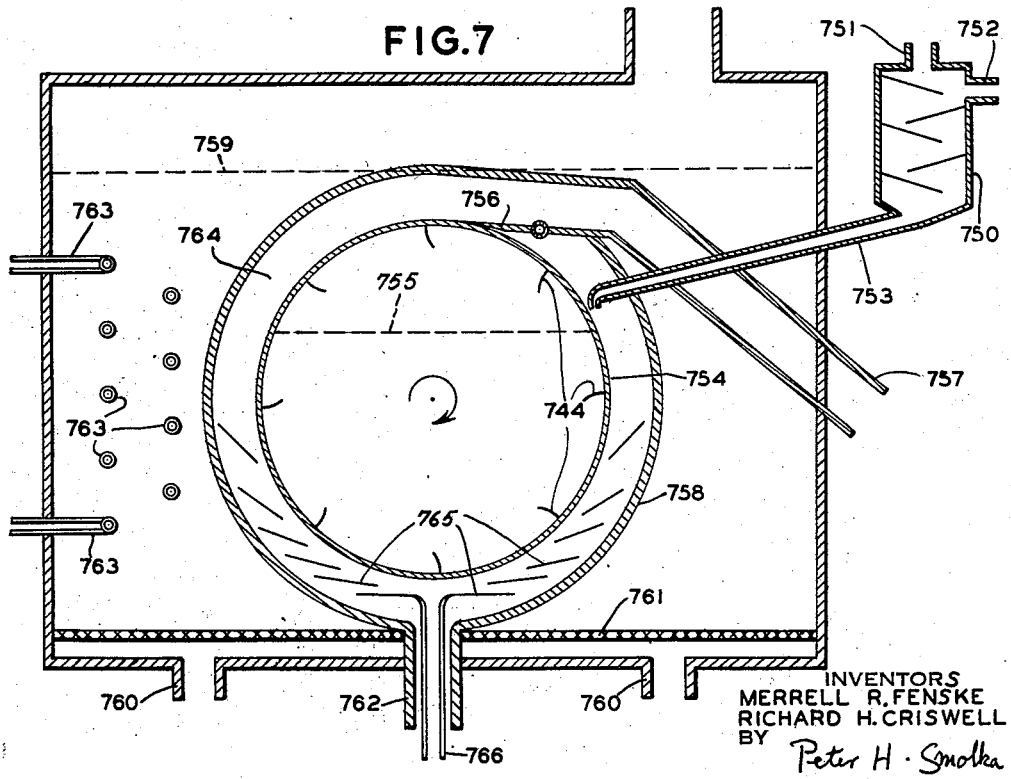
Fig. 7 is a transverse sectional elevation of a heat exchanger for high temperature vaporization, coking, drying, or calcining.

Figure 7 illustrates an application of the novel heat exchanger of the type illustrated in Figures 3, 4, and 5, in a high temperature vaporization, coking, drying, or calcining process where a solid product as well as a gaseous or liquid product is obtained from a liquid or slurry feed which is heated or vaporized in the exchanger.

The exchanger operates in the following manner. A partially heated liquid, e.g. a petroleum residue, enters a defoamer tower 750 through inlet 751 where dissolved gases are removed to the desired degree from the feed by the application of vacuum to outlet 752. The feed material then travels through feed pipe 753 and is deposited on the revolving exchanger surface 754 in a thin layer. An essentially unaerated but well agitated bed of granular solids 755, fired or heated directly by passage of liquid or solid fuel and combustion air over the bed surface, is situated inside of the cylindrical heat exchange surface 754. Internal impeller blades 744 mounted on the revolving cylinder 754 may be used to impel the solids from the bed into the passing stream of heating fluid thereabove and so to improve the heat exchange between the two.

The thin layer of feed material on the exchanger surface is heated by heat energy traveling through the surface from the bed of solids. Vaporization of the feed occurs on the surface 754. Solid coke remaining on the heat exchanger surface, and resulting from the pyrolysis of the liquid feed, is removed by a knife or scraper 756 and is recovered through outlet 757.

A concentric stationary cylindrical surface 758 also is preferably in contact with a fluid bed of granular solids 759, which is maintained in the fluid state by air or gas entering through inlets 760 and a porous floor or grid 761. The fluid bed of granular solids 759 is maintained at a lower temperature than the dew point or condensation temperature of the vapors rising from the revolving surface 754 into the open annular space 764. The concentric surface 758 acts as a condenser with the condensed liquid product removed through outlet 762. Heat from the condensing liquid product travels through surface 758 into the fluidized bed of solids 759 to be removed by a cooling coil or stream boiler tubes 763.

In order to recover the large amount of sensible heat in the condensed liquid products, a countercurrent heat exchange with the incoming cold liquid or slurry feed could, of course, be carried out in a separate conventional heat exchanger (not shown). This preheated feed would then enter feed line 751.

Entrained liquid or drippings from surface 754 are caught by baffles 765 to be collected and drained out through line 766 whence they can be returned to line 751.

It will be understood that the foregoing general description and specific illustrations of the invention are not intended as limitations of the invention, but that the ultimate scope of the latter is particularly pointed out in the appended claims.

We claim:

1. A heat exchange apparatus which comprises a substantially horizontal cylindrical shell, a cylindrical rotor of heat conductive material and of smaller diameter than said shell positioned in said shell in a gas-tight manner and defining a substantially annular space therewith, said space being partially filled with a bed of granular solids, means adapted to drive the rotor, heat transfer means within said rotor, a gas inlet adapted to admit gas to the upper portion of said shell at one end thereof, and a gas outlet adapted for withdrawal of gas from the upper portion of said shell at the opposite end thereof.

2. An apparatus according to claim 1 wherein said heat transfer means comprises an electric heating coil.

3. An apparatus according to claim 1 wherein said heat transfer means comprises another bed of granular solids disposed within the lower part of said rotor and means for passing a gaseous heat transfer medium through said rotor above the last named granular bed.

4. An apparatus according to claim 3 wherein said rotor is provided with convolutions and stationary baffles are mounted between the convolutions of said rotor both within said rotor and in said annular space.

5. A heat exchange apparatus which comprises a closed flanged cylindrical shell disposed with its axis in a substantially horizontal direction, a smaller concentric cylinder of heat conductive material rotatably mounted on a hollow shaft in a substantially gas-tight manner within said cylindrical shell and forming an annular space therewith, a dense bed of granular solids disposed in said annular space to a height sufficient to submerge a major portion of said rotatable cylinder, paddles longitudinally mounted on the outer surface of said rotatable cylinder and adapted to impel solids from said bed in the direction of rotation of said cylinder, motor means adapted to rotate said rotatable cylinder, a gas inlet adapted to admit gas into one end of said shell at a point above the level of the bed of said granular solids, a gas outlet adapted for withdrawal of gas from the other end of said shell above the level of said bed of solids, and means for passing a fluid heat transfer medium through the rotatable cylinder via said hollow shaft.

6. An apparatus according to claim 5 wherein said rotatable cylinder has a convoluted surface.

7. An apparatus according to claim 5 wherein another granular bed is disposed within said rotatable cylinder and wherein said means for passing a fluid heat transfer medium through said rotatable cylinder includes a baffle adapted to deflect entrained solids from said heat transfer medium leaving said rotatable cylinder.

8. An apparatus according to claim 7 wherein said cylindrical shell contains a multiplicity of perforations in the bottom part of its wall adapted for injection of a fluidizing gas upwardly through said solids in the annular space.

9. An apparatus for vaporization of a liquid which leaves a solid residue which comprises a substantially cylindrical, horizontal closed shell, a smaller closed cylinder mounted rotatably therein and forming an annular space therewith, a bed of granular solids disposed within said rotatable cylinder, said bed defining an exposed surface portion within said cylinder, said bed portion and the inner wall of said cylinder defining between them a circular segmental passageway longitudinally of said cylinder above said bed surface portion, means for passing a heating gas through said segmental passageway over the surface portion of said granular bed, means interiorly of said cylinder and movable through said bed to mix said granular solids therein and to circulate portions of said granular solids from and to said bed by way of said segmental passageway and into contact with said heating gas passed therethrough, means for spraying a vaporizable liquid feed material on to the external wall of said rotatable cylinder beyond the crest of the rotational orbit thereof, whereby to vaporize at least a portion of said feed material, scraping means engaging said cylinder external wall beyond said spray means in the direction of rotation of said cylinder, said scraping means being adapted to remove solid residue from said wall, means for removing said solid residue and means for cooling said cylindrical shell to condense vaporized feed material in said annular space, and separate means for removing solid residue and condensate from said annular space.

10. An apparatus according to claim 9 which further comprises a baffle within said annular space adapted to collect droplets of unvaporized liquid feed, and means for removing the collected feed from said baffle.

11. A process for coking a heavy residual hydrocarbon feed which comprises revolving a cylindrical zone about a horizontal axis within a larger stationary cylindrical zone concentric with said revolving zone and forming an annular space therewith, maintaining a substantially settled bed of granular solids in a lower portion of said revolving zone in indirect heat exchange relation with said annular space, spraying heavy liquid hydrocarbon feed onto said revolving zone within said annular space near the crest of the cylinder downstream with respect to its direction of rotation, passing a gas stream at at least 850° F. longitudinally through said revolving zone above the surface of said granular bed at a rate sufficient to maintain said revolving zone above coking temperature, impelling a minor portion of said granular solids in said bed into said hot gas stream to be dispersed therein and thence at least partially returned to said bed by gravity separation from said gas stream, said solids minor portion abstracting heat from said gas stream and imparting heat to said bed as by direct heat exchange relationships, scraping and recovering resulting solid carbonaceous residue from the revolving zone at a point removed less than one revolution from the point of spraying, externally cooling said stationary zone to a temperature below the condensation temperature of the hydrocarbon vapors formed in the annular space, collecting unvaporized liquid feed portions in an intermediate collecting zone within said annular space, draining unvaporized liquid feed from a lower portion of said collecting zone, and separately draining condensed hydrocarbon vapors from a bottom portion of said annular space.

References Cited in the file of this patent

UNITED STATES PATENTS

| 25,109 | Gengembere | Aug. 16, 1859 |
| 950,880 | Thomson | Mar. 1, 1910 |
| 1,703,418 | Dwyer | Feb. 26, 1929 |
| 1,800,672 | Anderson | Apr. 14, 1931 |
| 2,063,860 | Wait | Dec. 8, 1936 |
| 2,526,906 | Schaab et al. | Oct. 24, 1950 |
| 2,664,389 | Rex et al. | Dec. 29, 1953 |
| 2,796,237 | Nettel | June 18, 1957 |

FOREIGN PATENTS

| 699,151 | Great Britain | Oct. 28, 1953 |
| 708,369 | Great Britain | May 5, 1954 |